(12) United States Patent
Meredith et al.

(10) Patent No.: US 7,635,099 B1
(45) Date of Patent: Dec. 22, 2009

(54) COMPONENT RECOVERY PROCESS

(75) Inventors: Paul Meredith, Summerville, GA (US); James A. Lindsey, Cartersville, GA (US)

(73) Assignee: Mohawk Carpet Corporation, Calhoun, GA (US)

( * ) Notice: Subject to any disclaimer, the term of this patent is extended or adjusted under 35 U.S.C. 154(b) by 134 days.

(21) Appl. No.: 11/564,692

(22) Filed: Nov. 29, 2006

Related U.S. Application Data

(60) Provisional application No. 60/740,520, filed on Nov. 29, 2005.

(51) Int. Cl.
   *B02C 19/00* (2006.01)
(52) U.S. Cl. ........................... 241/21; 241/24.19
(58) Field of Classification Search ............. 241/21, 241/24.19, 24.29, 24.21; 209/3
   See application file for complete search history.

(56) References Cited

U.S. PATENT DOCUMENTS

| | | | |
|---|---|---|---|
| 4,028,159 A | | 6/1977 | Norris |
| 4,519,114 A | | 5/1985 | Rhyne |
| 5,230,473 A | * | 7/1993 | Hagguist et al. ............... 241/3 |
| 5,397,066 A | | 3/1995 | Leitman et al. |
| 5,518,188 A | | 5/1996 | Sharer |
| 5,535,945 A | | 7/1996 | Sferrazza et al. |
| 5,598,980 A | | 2/1997 | Dilly-Louis et al. |
| 5,722,603 A | | 3/1998 | Costello et al. |
| 6,029,916 A | * | 2/2000 | White ..................... 241/24.19 |
| 6,059,207 A | | 5/2000 | Costello et al. |
| 6,126,096 A | | 10/2000 | Robinson et al. |
| 6,155,429 A | * | 12/2000 | Clark ......................... 209/725 |
| 6,250,575 B1 | | 6/2001 | White |
| 6,398,138 B1 | | 6/2002 | Robinson et al. |
| 6,752,336 B1 | * | 6/2004 | Wingard ...................... 241/20 |
| 6,786,988 B1 | | 9/2004 | Bell |
| 6,814,826 B1 | | 11/2004 | Bell |
| 6,953,119 B1 | | 10/2005 | Wening |
| 7,045,590 B2 | | 5/2006 | Bell |
| 2003/0225170 A1 | | 12/2003 | Courage et al. |

FOREIGN PATENT DOCUMENTS

CA 2206759 * 12/1998

OTHER PUBLICATIONS

"Regional Model—100 Million pounds—50,000 Tons/yr of Recycled Carpet Waste and Whole Carpet Waste," Pyroflex, LLC, undated.
Cline, "Plant Solves Decades-old Problem," *Augusta Chronicle*, Mar. 21, 2004; http://chronicle.augusta.com/stories/032104/bus_568062.shtml.

\* cited by examiner

*Primary Examiner*—Mark Rosenbaum
(74) *Attorney, Agent, or Firm*—Alston & Bird, LLP

(57) ABSTRACT

A component recovery process to recover one or more of the constituent components of a feed material. In one embodiment, the process is a carpet recycling process, the feed material being carpet, and the constituent components being fiber, filler and adhesive. The process can refine the polypropylene backing polymer and face fibers of post industrial edge trim selvage, whole carpet construction post industrial scraps and pieces, as well as whole carpet post consumer scraps and pieces and in particular mixtures there of. The process beneficially uses land filled edge trim and pre land filled selvage, whole carpet construction scraps and whole carpet post consumer scraps and mixtures there of for component purification.

37 Claims, 2 Drawing Sheets

COMPONENT RECOVERY PROCESS

CROSS-REFERENCE TO RELATED APPLICATIONS

This application claims the benefit of U.S. Provisional Application No. 60/740,520, filed 29 Nov. 2005, and is incorporated herein by reference.

BACKGROUND OF THE INVENTION

1. Field of the Invention

The present invention relates generally to a component recovery process, and more specifically to a carpet recovery process that refines polypropylene backing polymer and nylon, polyester and polypropylene face fiber from whole carpet and rug edge trim.

2. Description of Related Art

The standard, whole carpet construction includes fiber tufts, backing, filler material and adhesive material. See FIG. 1. A standard construction of carpeting is illustrated schematically by reference numeral 1. The carpeting includes face yarn 2, tufted into a woven or spun bonded fabric 5 known as a primary backing. The primary backing 5 has pile yarns 2 tufted therethrough extending outwardly from one face, a primary backcoating or precoat 3 on the opposite face, and at least one secondary backcoating or main coat 4. Other layers may also be associated with the carpeting 1.

The primary backcoating or precoat 3 typically comprises latex, PVC (polyvinylchloride), EVA (ethylene vinyl acetate), or other polymer-based material, and the secondary backcoating 4 may also comprise or include polymers. Typically one or both of the primary backcoatings 3 and secondary backcoating(s) 4 include filler. The most common filler is mineral filler, typically calcium carbonate, although other fillers may be utilized, or calcium carbonate can be used with other common materials such as metal salts. Carpeting 1 may be produced with the filler of one or both of the primary backcoating 3 and secondary backcoating(s) 4 comprising waste carpeting instead of calcium carbonate as all or part of the filler.

The carpeting 1 may also have any number of other layers, depending upon use. For example, the carpeting 1 may have a conventional secondary backing (typically a woven or needle punched fabric adapted to contact the floor or padding).

In the usual mode of manufacturing carpet, the fiber tufts are tufted through a woven or non-woven fabric, which is the primary backing. The part of the tufts on the exposed surface of the carpet comprises face fiber. The latex-based adhesive is applied to the back of the tufted structure to lock in the tufts. Next, the woven secondary backing is attached to the back of the primary backing to give the carpet added dimensional stability, as well as to provide for additional tuft bind.

Usually, the very edges of the carpet have no fiber tufted through the primary backing or any latex adhesive applied for a width of typically about 1.75 to 4.5 inches. These edges are parallel to the machine direction of the carpet manufacturing process, and are used to guide the carpet through the machinery by means of tentor pins in the machinery, which pierce the edge of the carpet and hold it under tension.

As a final step in typical carpet manufacturing, and prior to rolling up the carpet for sale, these parallel edges, having served their purpose, are trimmed from the carpet, producing carpet selvage edge trim waste. Such edge trim waste is typically about 3 to 6 inches in width, and has a small portion of tufts, typically about 1.25 to 4.25 inches in width, at one edge.

Thus, the edge trim is primarily a narrow swath of the whole carpet structure with generally a higher weight percentage of the backing, typically polypropylene polymer, than does the whole carpet structure.

TABLE 1 illustrates a typical, standard construction of whole carpet by % composition of its component types.

TABLE 1

| % Composition | Component Types |
| --- | --- |
| 40-60% | Face fiber (including, among others, nylon 6, nylon 6,6, polypropylene, polyester, wool, cotton, acrylic, and combinations there of) |
| 8-20% | Backing primary and secondary (most typically polypropylene) |
| 30-50% | Filler material (most typically calcium carbonate) |
| $\leq$10% | Adhesive material (most typically SBR latex rubber) |

TABLE 2 illustrates a typical carpet selvage edge trim by % composition of its component types. As can be seen, the more expensive face fiber component is kept to a minimum on the edge trim.

TABLE 2

| % Composition | Component Types |
| --- | --- |
| $\leq$60% | Face fiber (including, among others, nylon 6, nylon 6,6, polypropylene, polyester, wool, cotton, acrylic, and combinations there of) |
| $\geq$20% | Backing primary and secondary (most typically polypropylene) |
| $\leq$40% | Filler/adhesive residue (most typically calcium carbonate - SBR latex rubber slurry) |

As can be seen, whole carpet typically has less than a 20% composition of backing, while edge trim has a 20% or greater composition of backing.

Carpet selvage edge trim has historically been baled, and land filled as a postindustrial waste stream of the carpet manufacturing process. Recognizing the future value in this polymer rich edge trim scrap, the Dalton-Whitfield Regional Solid Waste Management Authority, Dalton, Ga., and possibly other landfills, have been isolating this material in "vaults". Interest in these vaults of edge trim scrap is expected, as the value and availability of petroleum-based textile components increase. These vaults of stored edge trim, as well as that currently being generated by carpet manufacturing, will be a strategic source of raw material for recycling products. It is a key strategic cost savings for the assignee to capture this valuable edge trim internally, avoiding the landfill cost, and maximizing the value of the individual edge trim components by the present invention. Furthermore, it is the intention of this invention to mine these land-filled vaults of polymer raw materials as the maximum value of the individual components.

The land fill vaults of edge trim, as well as that generated by carpet manufacturing today, comprises a specific polymer face fiber (tufts) or combinations there of (see TABLE 2).

While edge trim can be segregated by face fiber type at the carpet plants, for example, as disclosed in U.S. Pat. No. 6,059,207, baled mixed face fiber edge trim is the typical carpet plant waste stream. The amount of face fiber pile left on the backing scrim is minimized by the carpet manufacturer. Therefore, compared to whole carpet construction, the edge trim almost always comprises a larger component concentration of backing polymer than that of whole carpet construction (see TABLE 1 and TABLE 2). This specifically points to a need in the art, wherein it would be advantageous to mix the backing rich edge trim selvage with face fiber rich post consumer as well as face fiber rich whole carpet post industrial scraps and trimmings.

Conventional recycling programs for the recovery of components of edge trim selvage involve utilizing the material "as-is", or at a low percentage in a mixed low value composite product. Examples of such a product are mixed fiber padding and mixed polymer resin of limited application. Yet, whole edge trim value can be enhanced as a melt polymer with combinations of combatiblizers, modifiers, and other physical and chemical agents, used to enhance the whole edge trim composite melt mixture performance. Such agents most typically are quite costly, so their use is specifically and critically minimized compared to the weight percentage of the product.

Carpet selvage edge trim recycling is disclosed in U.S. Pat. No. 4,028,159, wherein selvage is heated to produce a mixture of meltable resins that is separated from any solid residue, and then used in the adhesive mixture in subsequent carpet manufacture. This melt filtration process produces recovered polymer that has been significantly degraded, adversely impacting the recovered polymers' physical properties. Finally, while the resulting mixed resin may be used in carpets with hot melt adhesive backings, as disclosed in applicant's U.S. Pat. No. 6,814,826, herein incorporated by reference, it is not desirable in a typical SBR latex-backed carpet, and the mixed resin has little value if sold on the waste market as a polymer.

U.S. Pat. No. 6,059,207 describes a carpet selvage waste polymer recovery process that first segregates edge trim by face fiber type, and then shears the desired polymer face fibers for highly purified recovery. This process is not being practiced, most probably due to its complexity (multiple intricate mechanisms, carpet mill cooperation and coordination of their variable processes), and the high cost of required multiple lines and locations for economic viability of face fiber recovery.

Therefore, it can be seen that a need yet exists for an effective edge trim component recovery process that efficiently and effectively separates and maximizes the value of the individual polymer and adhesive components. In addition to selvage recovery, it would be beneficial to provide a process that enhances the recovery of whole carpet post industrial scraps and pieces, as well as post consumer whole carpet scraps and pieces, as well as alloys or mixtures of selvage and whole carpet construction scraps and pieces. Furthermore, it would be beneficial to provide a process that can be utilized effectively with a feedstock of polypropylene face fiber whole carpet, as well as polypropylene face fiber selvage edge trim. It is to such processing that the present invention is primarily directed.

BRIEF SUMMARY OF INVENTION

Briefly described, in its preferred form, the present invention is a component recovery process to recover one or more of the constituent components of a feed material. In a preferred embodiment, the process is a carpet recycling process, the feed material being carpet, and the constituent components being polymer fiber, filler and adhesive.

While the process can focus on edge trim selvage, it can beneficially be used with a mix of carpet inputs. In an edge trim recycling process, the invention is used to refine the polypropylene backing polymer and face fibers of post industrial edge trim selvage, whole carpet construction post industrial scraps and pieces, as well as whole carpet post consumer scraps and pieces, and in particular mixtures there of. The process beneficially uses land filled edge trim and pre land filled selvage, whole carpet construction scraps and whole carpet post consumer scraps and mixtures there of for component purification.

The present invention includes a process for mixing edge trim selvage and other post industrial scraps and trimmings with post consumer whole carpet to enhance the component recovery quality and economy. The benefits of this mixture as a preferred feedstock will become apparent upon reading the following disclosure.

The present invention includes a process to utilize post consumer whole carpet as a preferred feedstock to generate post consumer polymer and post consumer filler components to be utilized into new products, replacing equal or higher value virgin resources.

In preferred embodiments, the present process can include one or more of fifteen processing steps, including shredding, first screening, impact attrition, second screening, granulating, first slurrying, centrifuge separation—high G-Force, second slurrying, centrifuge separation—reduced G-Force, first screen centrifuging—high G-Force, face fiber drying, second screen centrifuging—high G-Force, backing drying, collecting—filler/adhesive, and filler product treating.

In preferred embodiments, the present process can further include one or more of six auxiliary recirculation recovery and polishing steps, including dryer bypass—direct to densifier, middle cut screening −10 mesh/+100 mesh, recovery centrifuge with modified density solution, an ionization step, positive polarity electrostatic polishing separation, and negative polarity electrostatic polishing separation.

In preferred embodiments, the present process provides one or more of the following valuable products/streams, purified face fiber polymer (typically nylon) that is rendered to varying degrees of purity through out the process, and can be extracted at any one of multiple points to meet an application, purified backing polymer (typically polypropylene), purified filler/adhesive filler raw material, purified face fiber for depolymerization, opened cleaned fiber pad raw materials, and cement kiln or other raw material and fuel.

In another preferred embodiment, the present process uses electrostatic ionization to enhance and/or manipulate the dry material sifting effectiveness.

In another preferred embodiment, the present process uses a single cone centrifuge for the separation, with a water medium, to process the edge trim, whole construction pieces and mixtures there of into purified components. Such a process can use a second continuous horizontal scroll/screen centrifuge in series to treat the low-density polymers.

In another preferred embodiment, the present process adds back to the purified polymers an enriched calcium carbonate/latex filler as an integral mineral reinforcement valuation. Alternatively, this filler can be utilized back into new carpet construction as disclosed in applicants U.S. Pat. Nos. 6,786, 988, 6,814,862, and 7,045,590, each herein incorporated by reference.

In another preferred embodiment, the present process generates a high melt/high-density raw material polymer alloy from deliberately mixed face fiber (coarsely or even unsorted) edge trim and post industrial whole carpet scraps and post consumer whole carpet scraps. The preferred mixture is nylon type 6 and type 6,6 for multiple beneficial reasons.

In yet another preferred embodiment, the present process utilizes, in combination, a solid bowl decanter centrifuge utilizing a water separation solution, with a continuous horizontal scroll/screen centrifuge, so as to readily separate and dry properly cleaned and prepared scrap fiber mixtures.

In yet another preferred embodiment of the present invention, the present process utilizes a common solid bowl centrifuge at low G-Force to separate and extract two materials with specific gravities heavier than water. Specifically, it can separate the highest density geometrically smaller particles of filler component from the much lower density nylon or polyester face fibers component in a water solution. Utilizing a solid bowl decanter centrifuge utilizing a water separation solution at low G-Force in combination with a continuous horizontal scroll/screen centrifuge, readily separates and dries both resultant streams.

Another preferred embodiment of the present process includes utilizing a center cut, pre or post centrifuge backing separation screening arrangement to purify the resultant face fiber stream purity by coarse mesh screening the filler laden coarse particles, and by micro low mesh screening off the filler laden powder residue.

In another preferred embodiment, the present process utilizes the filler rich screenings stream with a refining centrifuge and aqueous solution such as saline (sodium chloride) to extract and separate the polymer residue back to the polymer component stream.

Thus, it is an object of the present invention to refine the polymer component purities in a process to recycle edge trim, whole carpet construction post industrial and post consumer, which allows for the increased, effective use (cost and performance) of agents used to enhance the whole edge trim and whole construction composite melt mixture performance.

These and other objects, features and advantages of the present invention will become more apparent upon reading the following specification in conjunction with the accompanying drawing figures.

DETAILED DESCRIPTION OF PREFERRED EMBODIMENTS

Figure 1:
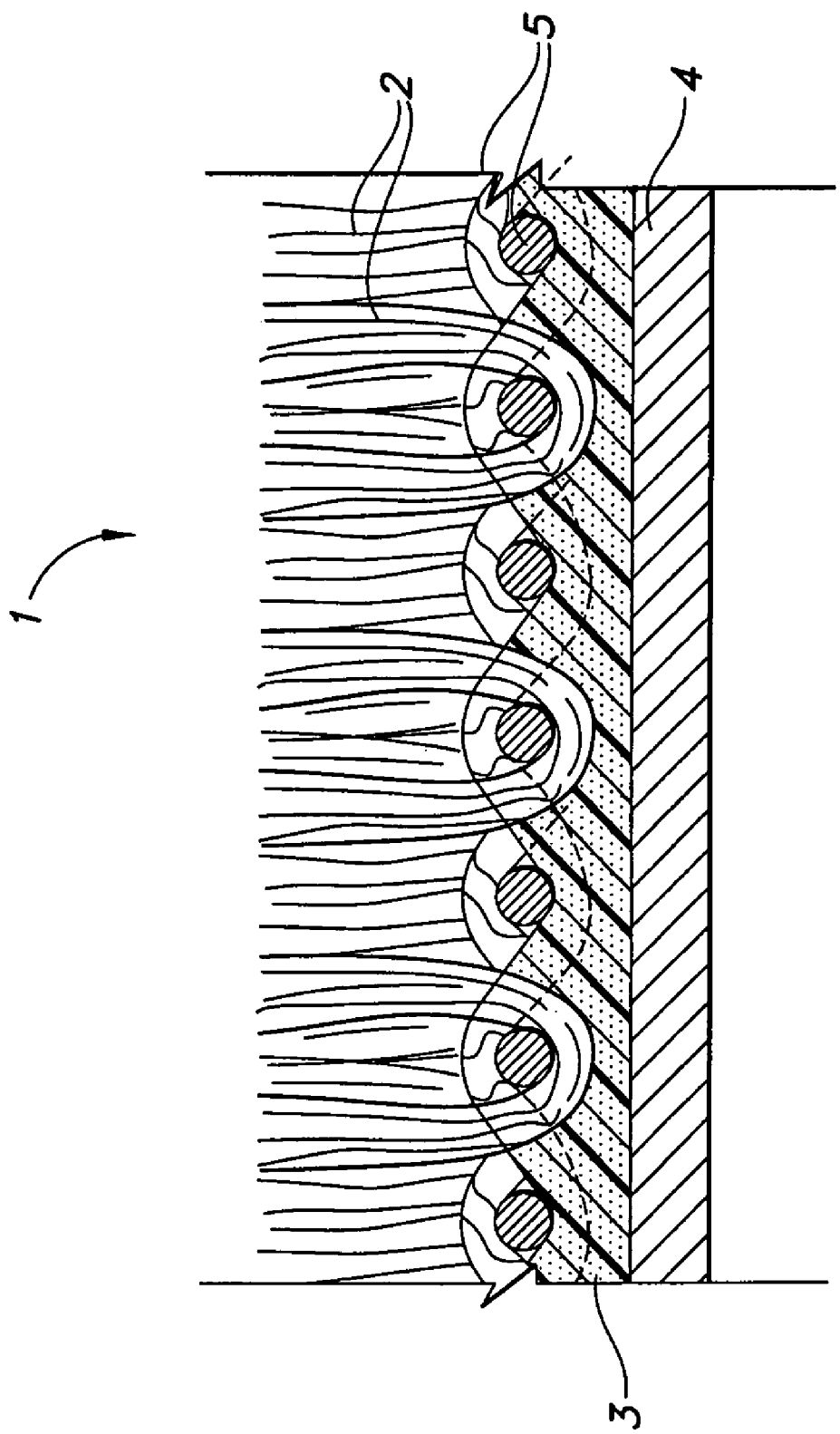
FIG. 1 is a prior art carpet construction.

Referring now in detail to the drawing figures, wherein like reference numerals represent like parts throughout the several views, FIG. 1 illustrates a conventional carpet that the present process can beneficially recycle.

Figure 2:
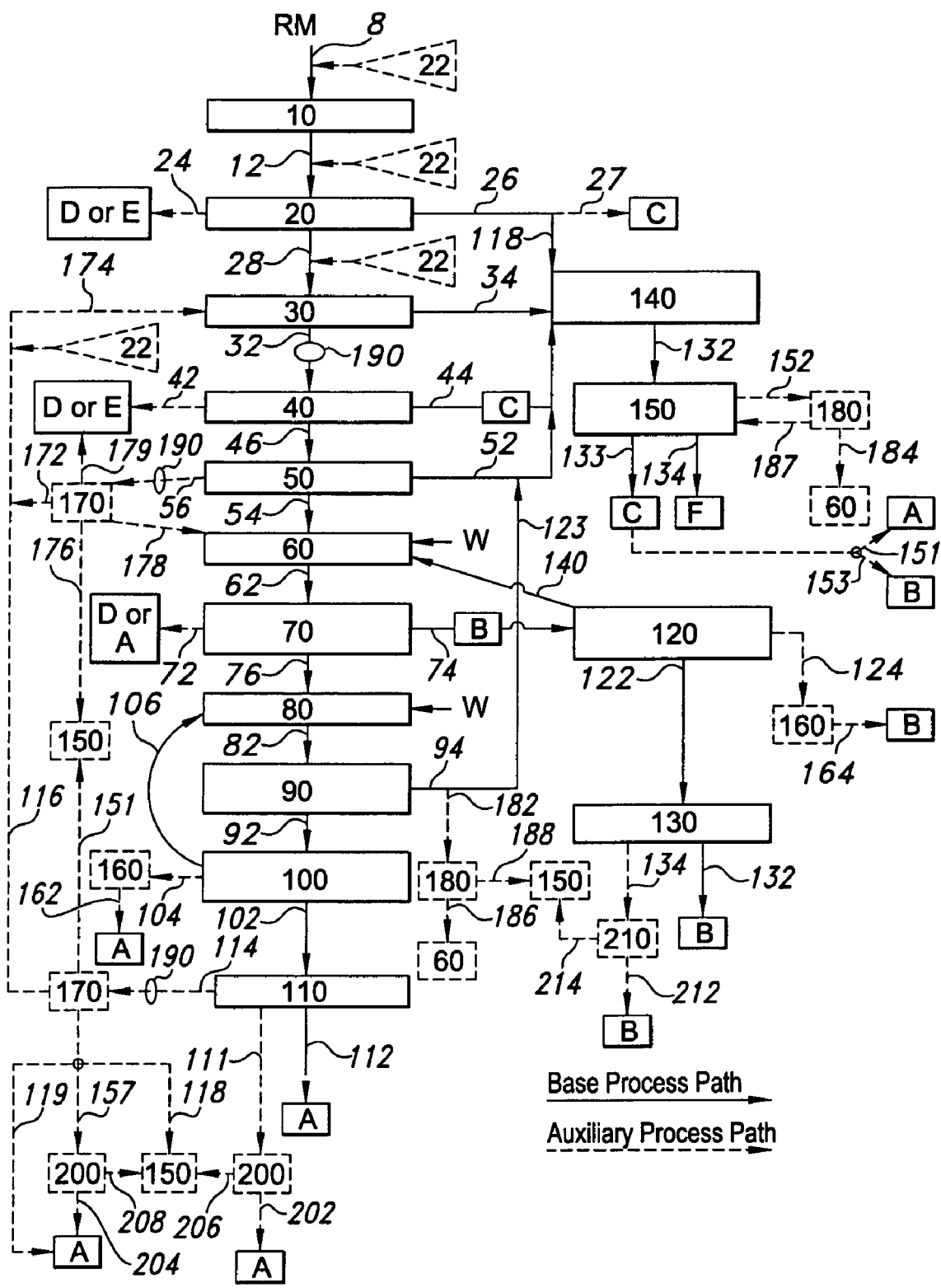
FIG. 2 is a flow chart of the present process according to a preferred embodiment.

In preferred form, the present component recovery process comprises one or more of various specific steps shown in FIG. 2. In a first shredding step 10, strategic mixtures of the raw material feed RM are placed on a mechanical conveyor 8.

The RM feed is preferably strategic combinations of post industrial carpet manufacturing edge trim selvage and whole carpet construction, preferably post consumer scrap.

As discussed, the standard, whole carpet construction includes fiber tufts, backing, filler material and adhesive material. In some arrangements, the backing can include two components, the primary backing scrim and the secondary backing netting.

The primary backing is a supportive scrim through which the tufts are tufted, and is usually polypropylene; however, other materials such as polyester can be used. The secondary backing is a fabric that is adhered behind the primary backing, sandwiching therein the back of the tufts with the adhesive material. The secondary backing is usually a fabric, typically made of polypropylene; however other backing types, such as jute, can be used.

The standard carpet construction filler material (calcium carbonate) and adhesive material (latex rubber) are most typically applied to the backside of the tufted carpet backing as a slurry in various percent combinations. A typical filler/adhesive ratio can comprise 80% calcium carbonate filler to 20% latex rubber adhesive. The filler component is almost always higher relative to the latex.

The adhesive material functions to bind the tufts with the backing. Adhesive material can include latex, being carboxylic-styrene-butadiene rubber, styrene-butadiene rubber (SBR), natural rubber latex, and other natural or synthetic rubber. Latex is the most commonly employed adhesive material for holding tufts to the carpet backing.

The material is sorted by face fiber and backing type prior to processing. The mixture of post industrial and post consumer can be preferably arranged in a ratio anticipating the resultant material product quality based on the performance of the various steps of the present recycling process. Blending the face fiber rich post consumer whole carpet raw material with a polypropylene backing rich material provides strategic advantages in resultant quality and economy.

The RM feed of the present process is typically inspected, and undesirable carpet material and non-carpet material is culled, like tramp metal. A commercial metal detector can be utilized on conveyor 8 to detect and reveal hidden metal debris for removal, and can keep such hidden debris from harming a shredder of the shredding step 10 and other downstream process equipment.

In preferred form, the present process begins with this step 10 of shredding the RM. A variety of machines are conventionally used in textile recycling as primary size reduction devices. A preferred machine is known in the industry as a Single Roll Shredder.

The "grind size" or level of dismantling of the carpet in such a machine can be manipulated by a variety of adjustments, including, but not limited to:
 1) Evacuation screen size and geometry,
 2) Shred chamber material evacuation method (pneumatic or gravity),
 3) Cutting rotor RPM,
 4) Rotor cutter teeth size, teeth geometry, number and teeth position(s) on the rotor,
 5) Bed blade to cutter teeth tolerance,
 6) Bed blade to rotor tolerance,
 7) Feed Ram geometry,
 8) Feed ram cycling frequency and control scheme, and
 9) Feed hopper loading.

A main purpose of this shredding step 10 is to deconstruct the carpet scrap composite both as efficiently and effectively as possible into liberated, individualized components generating a mixed fiber fluff in preparation of ensuing separations.

The calcium carbonate filler and adhesive rubber material is friable and in this step readily breaks up into small particles, with the force of impact, as compared to the highly resilient polymer fibers. These carpet polymer fibers are engineered for high tenacity.

Optimization of the shredder adjustments can increase the effectiveness of this shredder liberation step, and can reduce any liberation-processing steps required down stream for effective recovery of carpet matrix components. For example, controlled manipulation of some of the steps, including the (1) evacuation screen size (<<3") in combination with (2) aggressive pneumatic material evacuation with a faster (3) cutting rotor RPM, can limit, or even eliminate, downstream attrition steps. For example, effectively optimizing one or all of the listed shredder adjustments could eliminate the hammer mill 30 attrition step for a required application. Two shredders in series with said optimizations could comprise the liberation requirements.

It is thus clear that manipulation of size reduction 10 (using more or less) shredding for liberation (milling) purposes can effectively liberate and recover valuable carpet scrap components at a second step 20 of the present process, that being a first screening step 20.

Prior to discussion of the first screening step 20, it will be noted that a pre-drying step 22 can be used in the present invention, wherein the RM feed is pre-dried. In a preferred embodiment, to pre-dry whole component RM, typically baled, raw material is radio frequency dried in an industry-known RF dryer, or microwave dried, or dried in another non contact/non invasive moisture extraction technique that is not dependent on extreme heat, of any source, focused on the outer surface of the bulky intermingled pieces of RM. RF or microwave drying advantageously extracts moisture from the feed bale RM with out disturbing it or added bale breaking or loosing steps where conventional high temperature drying can be practiced. It will be understood by those of skill in the art that step 22 represents a pre-drying step of a particular feed stream prior to a number of steps of the present invention. For example, a pre-drying step of the feed stream to steps 10, 20, 30, and 170 is shown in FIG. 2, which includes only representative examples of using this pre-drying step 22, including other known drying techniques of the feed streams to steps 10-30, that is, prior to the size reduction and attrition steps 10-30, enhances the component liberation effect.

The composition of the as-shredded resultant material stream 12 is dependent on the shredder application. Aggressive shredding can generate highly liberated filler/adhesive from the mixed fiber (face and backing) components. Drying the scrap material in step 22 prior to shredding enhances this liberation. Therefore it is recognized as a preferred embodiment to proactively keep the raw materials RM dry, thereby directly improving this process economy (less drying cost) and processes cleaning performance.

The present process can further comprise the first screening step 20, wherein a mechanical screening apparatus and air elutriation classification system is utilized, and both known in the recycling industry. Mechanical screening/sifting can comprise a variety of techniques including, but not limited to:

1) Flat and angled vibratory single screen deck to multiple classification decks (configurations typically include rectangular and round but comprising any geometry or physical configuration) with single axis to multiple axis vibratory actions, 2) Rotary cylindrical screening trommel devices, comprising low or high G-Force, 3) Active basket style step cleaners, including a wide variety of cotton and wool fiber cleaning systems and the like, and, 4) Air elutriation classification systems and the like.

A wide variety of particle screening sifter/classification systems can be employed in whole, in part, or combination, to separate the friable liberated carpet scrap calcium carbonate filler and latex adhesive particles from the coarser, more intact face and backing fibers.

Air elutriation is especially effective at removing hard and dense debris (tramp metal and the like) common in the recycling of raw material streams. Introduction of electrostatic ionization (i.e. free electrons) prior to or with in the sifting screening step(s) 20, 40 directionally reduces the triboelectric cling force between the filled latex rubber residue and polymer fibers, allowing increased levels of separation effectiveness. The effects of this/these steps include enriching the component streams of polymer fibers and filler/adhesive component streams A, B, C, D, E and F.

The present process can provide many beneficial resultant streams at various locations of the process. As used herein, stream A is a purified face fiber polymer (typically nylon), stream B is a purified backing polymer (typically polypropylene), stream C is a purified filler/adhesive filler raw material, stream D is a purified face fiber for depolymerization, stream E is an opened cleaned fiber pad raw materials, and stream F is a fuel stream, for example, cement kiln or other raw material and fuel. It will be understood by those of skill in the art that similar component streams can be extracted at various points in the present process, and they will be at different purities dependent on the product application and where in the present process the material stream is extracted.

Effective screening of the as-shredded raw material 12 generates higher value resultant products, streams D or E, and stream C. Both of these steams (D or E) and C can be used at this point in the process as a higher value.

The stream of mixed/dry-cleaned fiber 24 is suitable for depolymerization feed stocks D, as well as for synthetic pad fiber raw material E. The stream of purified filler C can be formed through screening the effluent stream from step 20, for example, through 30 mesh screens 26, 27 suitable for direct reinforcement in polymer resins. See, TABLES 3, 4.

TABLE 3 illustrates recovered carpet filler/adhesive mineral reinforcement in nylon polymer, wherein the filler/adhesive % is measured by heating the filler/adhesive at 600° C.

TABLE 3

| Target Filler loading | Control 0% | 5% | 10% | 15% | 20% | 25% | 30% | 35% | 40% |
|---|---|---|---|---|---|---|---|---|---|
| Measured-30-mesh filler/adhesive loading (%) | <1% | 6.6% | 13.7% | 19% | 21% | 22% | 29% | 35% | 43% |
| Tensile yield strength (psi) | 11,000 | 10,886 | 8,697 | 7,726 | 7,630 | 6,759 | 6,744 | 6,405 | 5,814 |
| Elongation at break (%) | 13% | 15% | 23% | 15% | 17% | 14% | 9.0% | 8.7% | 6% |
| Flexural Modulus (kpsi) |  | 458 | 424 | 427 | 434 | 438 | 443 | 442 | 453 |

TABLE 4 illustrates fiberglass filled with recovered carpet filler/adhesive mineral reinforcement in nylon polymer, wherein the filler/adhesive % is measured by heating the filler/adhesive at 600° C.

TABLE 4

| % Fiberglass added | 0% | 0% | 33% |
|---|---|---|---|
| Target Filler loading | Control 0% | 10% | 10% |
| Measured-30-mesh filler/adhesive loading (%) | <1% | 10% |  |
| Tensile yield strength (psi) | 9,400 | 7,530 | 9,513 |
| Elongation at break (%) | 13% | 18% | 3% |
| Flexural Modulus (kpsi) | 323 | 317 | 960 |

TABLE 3 illustrates the effective direct use of the filler/adhesive stream C, at −30 mesh for this example, to mineral reinforce nylon polymer with minimal or measured reduction of important engineering resin properties including flexural modulus and elongation. An important feature to emphasize is this retention of engineering property is maintained and/or managed for any product application by displacing valuable polymer in this case of nylon A 151. The polypropylene backing stream B can also be filled as such 153.

Additionally, strategic additives of a wide variety can be added to these reclaimed polymers to build back or advance certain property requirements for a specific application. TABLE 4 documents by example that a common engineering resin additive of 33% fiberglass reinforcement additive can build back product tensile strength while enhancing flexural modulus.

Fiber stream 24 is a valuable polymer matrix (backing rich polymer with face fiber content or face fiber rich polymer with backing or balanced matrix dependent on the alloy of whole construction and selvage carpet scrap mixed).

Filler/adhesive material stream C (calcium carbonate rich filler with latex adhesive and fiber residue), is a heavy, dense post-industrial dry-powder filler desired as mineral reinforcement in polymer resins and the like as discussed and demonstrated at TABLES 3 and 4, as well as product sustainability requirements (i.e. the inherent value of post industrial or even more valuable post consumer material content in many products).

It is within the scope of the present invention to utilize the materials (streams 24 and 26) at this point in the process if the end goal is to recover the newly created composites streams (face fiber plus backing fiber polymers at predetermined resultant ratios and filler plus adhesive material) at higher performance than the value of the original whole carpet scrap or edge trim or alloy mixture composite material. This is, in essence, a novel and non-obvious two step recycling process.

For instance, the present invention can comprise this abbreviated, two-step process, useful on edge trim selvage and carpet scrap or alloy mix for a main purpose of acquiring a refined intermediate composite fibrous material that takes less polymer additive (and therefore cost) of combatiblizer, modifiers, and/or other physical and chemical agents to enhance the performance or value of said material. Also, this two step process can greatly enhance the economy of nylon D by improving the effective yield of depoly, as well as likely costly chemical additives to neutralize the filler and adhesive matrix contaminant.

Stream C (26, 27) as a 200-mesh screened stream can be directly recycled back into new carpet, displacing virgin filler with higher value recycled content filler among the valuable applications.

In a preferred process, at this stage of the present process, stream C is pulled off, and streams D/E are not, leaving the mixed/dry-cleaned fiber stream effluent 28 of step 20 to continue through the several steps of the present invention. As previously discussed, stream 28 can be dried in a step 22 as a desirable preparation for step 30, an impact attrition step of the process.

The present process can further comprise an impact attrition step 30 to further liberate the polymer and filler/adhesive component from the mixed one time dry-cleaned fiber stream. A variety of milling systems are conventionally used in recycling as high attrition size reduction devices. Milling devices can be even more effective than shredders or other known size reduction devices at liberating the friable calcium carbonate/latex adhesive residue from the resilient tenacious face fiber and backing fiber polymer components.

This high attrition milling action can create fine filler/adhesive particles that can be easily sifted from the coarser, more intact, polymer fibers. A variety of devices can be configured to create a milling (as opposed to cutting) action. These include conventional granulators of a variety of configurations and geometries, as well as ordinary mechanical or pneumatic material handling actions, and the like.

The preferred machine to carry out the milling step of the present invention is a pneumatically evacuated hammer mill 30 with wear resistant fixed hammers on a rotor. As with the shredder (of the step of shredding 10), the level of filler/adhesive liberation from the polymer fibers in this machine can be manipulated by a variety of adjustments, including, but not limited to:

1) Evacuation screen size and geometry,
2) Pneumatic material evacuation is required, but the pneumatic rate (volume) can be varied to effect liberation (effectively relates to resonance time of the material in the milling chamber),
3) Cutting rotor RPM effecting impact force
4) Number of hammers, hammer geometry, and hammer position/configuration on the rotor,
5) Feed rate, control and mechanisms.

The purpose of the mill essentially is to deconstruct the carpet selvage and or whole carpet scrap composite efficiently and effectively to a greater degree or magnitude, than the shredder, into liberated individualized components in a fiber fluff form in preparation of ensuing separation steps. Optimization of the mill machine adjustments increases the liberation effectiveness and reduces further liberation-processing steps required to more effectively recover polymer fiber components.

This hammer milling further liberates the friable filler/adhesive component of the carpet matrix from the resilient tenacious mixed fibers. The milling step 30 is a preparatory step for further screening off, from the fibers, the filler/adhesive component.

The resultant stream 32 can be treated in an ionization step 190 with ionization (free electrons) to enhance the screen sifting separation effectiveness. In one embodiment, the hammer mill requires pneumatic suction to commutate the material into and out of the attrition chamber, and therefore requires a pneumatic discharge exhaust stream 34 to a collection system 140.

The material of stream 32 is relieved of the pneumatic suction-air via one of a variety of known commercial air condensers, such as a cyclone, rotary drum condenser and the like. This exhaust air-material separation comprises an additional separation of fine (dust) filler/adhesive particles entrained in the pneumatic exhaust air stream. Equipment set up steps comprising ionization and rotary air/material separation condenser is a preferred embodiment to optimize mixed-fiber and filler/adhesive separation.

The present process can further comprise a second screening step 40 not unlike the first screening step 20.

After the four steps 10, 20, 30 and 40, two higher value resultant products can be pulled from the process. A mixed/dry-cleaned fiber stream 42 suitable for depolymerization feed stocks D as well as opened-cleaned synthetic pad fiber raw material E. Further, a purified filler stream C is provided, through screens comprising −30 mesh 44, and is suitable for direct reinforcement in polymer resins. See, TABLES 3, 4.

Stream C as a 200-mesh stream can be directly recycled back into new carpet, displacing virgin filler among the valuable applications.

In a preferred process, at this stage of the present process, stream C is pulled off, and streams D/E are not, leaving the mixed/dry-cleaned fiber stream effluent 46 of step 40 to continue through the several steps of the present invention.

The present process can further comprise a granulating step 50, being a preparatory step specifically for optimizing the downstream centrifuge separation step 70. A key to this granulating step 50 is the "grind size" affected by many of the same variables as listed in both the shredding step and the milling step.

An evacuation screen size of <8 mm (<5/16 in. mesh) can be used to create a fine grind fibrous material in which a standard solid bowl decanter centrifuge can easily separate the different density polymers using a water medium. Care should be taken when fine grinding, as to not overheat the fibrous material above the backing melt temperature where undesired fusion or adhesion of the polymer fibers and or filler/adhesive can occur, as this reduces separation effectiveness and resultant component purities.

One or more of the many granulator-cooling techniques can be employed, such as internal grind chamber and rotor cooling with water or other fluids. Directionally, the finer the grind, the better the resultant component purity and centrifuge performance (the finer the grind size, the higher percent solids slurry to the centrifuge directly increases rate and/or improved separation purity). Therefore, the fineness of grind is assessed against the processing cost and output material quality. It is here noted that careful mixing of the alternate face fiber rich whole carpet scraps, including post consumer carpet, to backing polymer rich edge trim selvage to balance these components can be used to neutralize the extremes or amplification of the expected residue carry over.

As with the hammer mill, in one embodiment, the granulator requires pneumatic suction to commutate the material into and out of the cutting chamber, and therefore requires a pneumatic discharge exhaust stream 52 to a collection system 140.

The granulated material of stream 54 is relieved of the pneumatic suction-air via one of a variety of known commercial air condensers, such as a cyclone, rotary drum condenser and the like.

It is at this point in the process, via stream 56, an additional "center cut" screening technique 170 can be employed to enhance the distinct nature of carpet composite deconstruction after fine grinding. With these all inclusive process attrition steps up to this point, the filler and adhesive (non-polymer fibers) component of the scrap carpet matrix tends to develop into a fine mesh powder rich in filler and adhesive. Also, any coarse chunks in the worked matrix are generally rich in filler and adhesive as well.

Therefore, such a "center cut" screening step 170, at this point in the process, or otherwise downstream, can enrich the polymer fibers by, for instance, screening off the coarse fiber, by example 10 mesh "overs" screenings 172, and recycling this side stream back upstream into the process via 172 (for example, step 30) for further attrition. Alternately, screening off the less than by example 100 mesh screenings results in a higher polymer rich fiber stream 178 (<10 mesh, +100 mesh) and a calcium carbonate/adhesive rich filler stream –100 mesh 176.

These streams can then be individually used at higher value or further refined with the combinations of processing steps disclosed.

The present process can further comprise a slurring step 60. A slurry tank can be provided with a mixer, wherein the dry-cleaned, finely-granulated mixed fiber stream 54, alternatively 178 in an auxiliary embodiment, is slurried with water W at a relatively low <10% solids concentration, and mixed aggressively with an impeller or the like to homogenate this slurry mixture in preparation of the centrifuge separation step 70. As needed, a commercially available wash slurry water treatment comprising detergents, surfactants, defoaming agents and the like, are added at low percentage to facilitate improvement to this cleaning and separation process.

The present process can further comprise a centrifuge separation step 70 for wash/scour centrifuge separation, wherein a solid bowl decanter centrifuge utilizing a water separation solution in combination with a continuous horizontal scroll/screen centrifuge 120 readily separates and dries the properly cleaned and prepared fibers.

The polypropylene-backing polymer floats (density <1 g/cm$^3$) on the water's surface, and is removed by hydraulic flow from the centrifuge bowl pond weir ports. The face fibers (density >1 g/cm$^3$) and remaining calcium carbonate and adhesive residue sinks, and are collected, and spun dry at the decanter centrifuge cone beach. This centrifuge separation step 70 in water can also act as a wash cleaning step that improves the quality of both streams.

Additionally, pretreatment of the material for cleaning purposes can improve the separation results and material quality. This includes, but is not limited to, rinsing, hot water washing, steam cleaning, detergents, wetting, defoamers and sanitizing agents and the like.

It is recognized that a significant percentage of the edge trim backing material has no filler/adhesive residue, and therefore can be separated under even more liberal (preparation) conditions. This improves process cost. Specifically, straight edge trim selvage in the present process can be purified and components recovered with minimal to no milling or attrition steps due to the lack of filler adhesive on much of the backing fraction.

Yet another preferred result of the present process includes that on polypropylene face fiber edge trim and polypropylene post consumer carpets, where the polypropylene face fiber and polypropylene backing material (both <1 g/cm$^3$) are easily separated from the filler/adhesive residue, the process creates a relatively low process cost purified polypropylene polymer raw material.

A preferred result of the present process with this polypropylene feed stream includes the relatively high percent solids that the centrifuge separation step can be effectively accomplished. A slurry of up to 10% solids efficiently separates due to the robust nature of the separation (divergence of the material component densities).

In a preferred embodiment of the present invention, at this step 70, two valuable raw material steams are created. A purified single polymer face fiber stream 72 with an ~85% purity (typically nylon) >1 g/cm$^3$ raw material is provided, with trace polypropylene backing polymer <5% and tramp filler/adhesive residue <15%, being suitable and preferred quality for depolymerization feed stocks 72/D as well as engineering resin grade polymer raw material 72/A. This stream 72 (separation heavies), is a new class of high melt (>200° C.) polymer rich compounds, useful for profile extrusion, injection and compression molding, among the applications. In a preferred embodiment, the dry calcium carbonate filler/latex adhesive material C, collected in the sifting process steps, first and second screening steps, can be discreetly added back 151 in a controlled fashion to this stream A for cost effective mineral reinforcement and/or filler purposes.

In addition to stream 72, a purified single polymer backing fiber stream 74/B with an ~90% purity (typically polypropylene) <1 g/cm$^3$ raw material is provided, with tramp nylon face fiber <10% and filler/adhesive residue <5%, suitable for engineering resin grade polymer raw material applications B, among others. This stream 74 (centrifuge separation floats), is a valuable purified (easily purified up to 99% in this process)

polypropylene with wide use application as a thermoplastic engineering polymer or low melt (<200° C.) fusion binder in padding products. This material moves to dewatering in a downstream centrifuge-drying step 120. In a preferred embodiment, the dry calcium carbonate filler/latex adhesive material collected in the upstream sifting process steps, first and second screening steps, can be discreetly added back in a controlled fashion 153 (i.e. at a follow-up densification process step, for instance) to this stream B for cost-effective mineral reinforcement and/or filler purposes.

In a preferred process, at this stage of the present process, stream B is pulled off, and streams D/A are not, leaving the effluent 76 from this step 70 to continue through the several steps of the present invention. This purified face fiber stream 76 proceeds to further refinement to step 80, and the purified backing fiber stream 74 to a drying step 120.

The present process can further comprise a second slurring step 80. A slurry tank can be provided with a mixer, wherein the purified single polymer face fiber 76, a finely ground ~85% nylon raw material with trace backing polymer and tramp filler/adhesive residue is slurried with water W at a relatively medium <30% solids concentration, and mixed aggressively with an impeller or the like to homogenate this slurry mixture in preparation of the separation step 90.

The present process can further comprise a reduced G-Force centrifuge separation step 90. By special arrangement, a common solid-bowl single-cone centrifuge is configured to effect the concentration of filler/adhesive residue in the stream slurry 82. This is accomplished by an unconventional configuration of intentional lowering the RPM of the typically high G-Force centrifuge, to result in forces on the slurry mixture 82 of $\leq$30 G-Force, whereby the major density difference (typically ~1.15 $g/cm^3$ for nylon face fiber and >>1.15 $g/cm^3$ for the filler/adhesive matrix) is exploited between the respective >1.0 $g/cm^3$ components by extending the resonance time of separation with the low G-Force.

Furthermore, typically the face fibers here are geometrically larger in combination with the lower density (i.e. lighter), wherein the effect is a lower acceleration from the minimal G-Force and allows the fibers to settle slower. The fiber component of the slurry 82 can be skimmed, in whole or in part, out of the float effluent pond weir ports of the centrifuge and are collected as a further purified face fiber stream 92, being a stream of >90% with reduced filler/adhesive residue <<10%, results. The extremely high density >>1.15 $g/cm^3$ small filler/adhesive particles quickly accelerate and preferentially compact at the cake end of the centrifuge bowl, are augured up the bowl cone by the internal helical material conveyance screw, are spun dry at bowl beach, and are discharged out of the bowl at the solids cake ports. A concentrated filler/adhesive stream 94 with fiber residue is further processed as shown in steps 180 or 150.

The present process can further comprise a first screen centrifuging step 100. The higher purified face fibers 92 are spun-dried by a preferred continuous horizontal scroll/screen centrifuge. This high G-Force "spin-drying screen" results in moistures levels of <20%, which is less than known alternate mechanical drying techniques. Other devices can be used, like the lesser effective conventional dewatering devices, such as bent or J-screening, screw presses and the like. The present process uses this centrifuge drying step 100, wherein the face fibers (>1 $g/cm^3$) are aggressively spun-dried.

In a preferred embodiment, the specific sequence of a low G-Force solid bowl decanter separation 90 of the high density (>1 $g/cm^3$) face fibers followed by a horizontal scroll/screen centrifuge step 100 for effective de-watering is used.

The higher purified, spun dry face fiber 102 is then dried in face fiber drying step 110 to "soft-waste" purified face polymer 112, typically nylon A or handled by an auxiliary dryer bypass step 160 via 104. Step 160 is a dryer bypass method that routes via 162 the material to a friction style agglomeration densifier, resulting in purified face fiber polymer A "hard-waste" when densified. Friction densified, known to the industry as Conduxing or Condux material is the preferred end product. The effluent 106 of the slurry 92 can be reticulated from step 100 to step 80.

The present process can further comprise a first drying step 110. Many types of dryers are widely known to the industry. In a special arrangement of step 100, the high G-Force screening centrifuge, and the resultant novel low moisture level of the purified face fiber stream 102, drying capital equipment cost and energy requirements are minimized. Flash drying, known to the industry, with hot air is one preferred embodiment used in the step 110 drying process.

The present process can further comprise a second screen centrifuging step 120. Purified backing, typically polypropylene +90% purity material generated in step 70 along with the slurry effluent 74 is spun-dried similar to the purified face fiber 92 at step 100 by a second continuous horizontal scroll/screen centrifuge. This high G-Force "spin-drying screen" results in moistures levels much less <20%, much better than known alternate mechanical drying techniques. It also replaces the exotic, much higher cost and lower rate double cone centrifuge technique.

The newly purified, spun dry backing fiber stream 122 is then dried in step 130 to "soft-waste" purified backing polymer 132, typically polypropylene B, or handled via 124 by the auxiliary step 160 of drying. Step 160 is a dryer bypass method that routes the material 164 to a friction style agglomeration densifier, resulting in purified face fiber polymer B, a "hard-waste" when densified.

The present process can further comprise a second drying step 130. Many types of dryers are widely known to the industry. In a special arrangement of step 120, the high G-Force screening centrifuge, and the resultant novel low moisture level of the purified backing fiber stream 122, drying capital equipment cost and energy requirements are minimized. Flash drying, known to the industry, with hot air is one preferred embodiment used in the step 130 drying process.

The present process can further comprise a collection step 140 liberated filler/adhesive material. Many types of collectors are known in the industry, such as dust houses, baghouses and the like, all having varying attendant costs and effectiveness. In a preferred embodiment, a continuous duty self-cleaning (vibration or reverse air jet among common techniques) hanging bag dust collector is utilized.

The present process can further comprise a filler product treating step 150, wherein filler product treatment purification takes place. This treatment step 150 can include a number of substeps, including screening, drying, milling and sanitizing.

The screening can be singular or advanced multi stage sift screening, although in a preferred embodiment, it includes a −200 mesh for direct application back into carpet filler latex adhesive mixture displacing virgin calcium carbonate; or a −30 mesh, which is desirable as a direct application as a polymer mineral reinforcement TABLES 3 and 4. +30 mesh 134 can be returned to the component recovery process 50 (or alternate points of reintroduction) for polymer recovery or reliably utilized as cement kiln raw material or a fuel source F.

Drying improves the friability of the filler/adhesive matrix, where milling is utilized. A drying step also improves extrudibility (where moisture is a negative) when used as a mineral reinforcement in engineering resin polymer or hot-melt polymer backed carpet backing, both preferred embodiments.

Milling improves particle consistency and yield of fine screening recovery. A roller mill, known to the industry typically as a Raymond Mill or a special high RPM impact hammer mill is preferably used.

Sanitizing can be particularly important with post consumer filler/adhesive stream valuation. Steps can include any of: open flame treatment, high intensity infrared, or other focused heat treatments directed at the filler product to deliberately singe the residual fibers in this matrix to improve screening classifying effectiveness as well as sanitizing the product.

While in the preferred process, one or more of the above processing steps are employed, one or more of the following auxiliary recirculation recovery and polishing steps can also be used.

The present process can further comprise a dryer bypass—direct to densifier step 160, which effectively is a truncated process to densifing, in some cases eliminating drying steps 110, 130 of the preferred processing steps. The highly purified face fibers 92 are dewatered and spun-dried by the preferred continuous horizontal scroll/screen centrifuge 100. This high G-Force (>100 G) is a novel application with fiber, to dewater and spin-drying screen technique results in moistures levels much less (<20%) than known in alternate mechanical passive (example "J-screen") or commonly utilized active (vibrating screen or screw press among examples) drying techniques.

Step 160 is a dryer bypass method that routes 104 the material direct to a friction style agglomeration densifier 162 resulting in purified face fiber polymer A "hard-waste".

In another embodiment, the newly purified backing fibers 74 are dewatered and spun-dried by the preferred continuous horizontal scroll/screen centrifuge 120. The high G-Force (>100 G) application is also used, wherein step 160 is a dryer bypass method used to route 124 the material direct to a friction style agglomeration densifier 164 resulting in purified backing fiber polymer B "hard-waste".

The present process can further comprise a middle cut screening step 170. Step 170 is a method of primary or auxiliary screening for increased purity of polymers and enhanced yield. Out of the granulator step 50, the finely granulated dry-cleaned mixed fiber stream 56 is screened through a three level classifying screener creating three size-classified material streams with four possible destination dispositions as follows:

Stream 172, a +10 mesh (~2.0 mm) material comprising about ≦15% of the granulator step 50 output stream 56 is high in filler/adhesive as well as polymer fiber, typically polypropylene backing, which is then returned back 174 to the step 30 impact attrition for further treatment to liberate polymer fibers from attached filler/adhesive contaminant. Drying step 22 can be effectively utilized on this recovery auxiliary stream 174 to enhance polymer recovery.

Stream 176, a −200 mesh (75 micron) material comprising about ≦10% of the granulator step 50 output stream 56 is high in filler/adhesive with very low polymer content, stream 176 being routed to process step 150.

Stream 178, a −10/+100-mesh, the middle cut, stream is a purified (further dry cleaned of filler/adhesive contaminate) mixed dry-cleaned fiber material, routed to process step 60.

Stream 179, similar as stream 178 material, with optional disposition routed to depolymerization feed stock material D.

Further, the fine grinding resultant stream 56 can be treated with ionization step 190 (free electrons) to enhance the screen sifting separation step 170 effectiveness.

A middle cut screening step 170 can also act upon stream 114 out of step 110. This high purity face fiber polymer stream 114 can have three possible destination dispositions as follows:

Stream 116, a +10 mesh (~2.0 mm) material comprising about ≦5% of the purified face fiber dryer step 110 output stream 114, being high in filler/adhesive as well as polymer fiber encased in filler, typically the polypropylene backing, a cross polymer contaminate at this point in the process. This stream is returned back via 116, 174 to the impact attrition step 30 for further treatment to liberate polymer fibers from attached filler/adhesive contaminant. Drying step 22 can be effectively utilized on this recovery auxiliary stream 174 to enhance polymer recovery.

Stream 118, a −200 mesh (75 micron) material comprising about ≦10% of the highly pure face fiber dryer step 110 output stream 114, being high in filler/adhesive with extremely low polymer content, which is routed to process step 150.

Stream 119, a −10/+100-mesh stream, being a further purified face fiber polymer A, typically nylon, preferentially densified with broad usage application and high value.

Further, this resultant face fiber stream 114 can be treated with ionization step 190 (free electrons) to enhance the screen sifting separation step 170.

The present process can further comprise a recovery centrifuge with modified density solution step 180. Side streams from the various processing and auxiliary polishing steps can contain valuable amounts of polymer fiber along with the heavy content filler/adhesive. These side streams can be treated with this optional recovery step 180. The streams with some valuable polymer fiber are identified as follows:

Stream 182, a high-density solids from process step 90 stream 94.

Stream 152, a select +30-mesh (600 micron) material from step 150.

The step of polymer recovery 180 includes the following substeps. First, slurry the recovery material streams (including but not limited to 182, 152) at a low percent solids (<10%) in a solution that has the density of the slurry solution raised to between the polymer face fiber to be recovered (~1.15 g/cm$^3$ typically for nylon recovery) and the heavy calcium carbonate (~2.8 15 g/cm$^3$) laden filler/adhesive. A minimally dense solution of approximately 1.2 g/cm$^3$ saves chemical cost of density modifier and is effective at extracting the valuable polymer face fiber in the next step, a high G-Force single cone centrifuge.

Second, utilizing a common single cone high G-Force centrifuge, similar to process step 70, yet much smaller in rate (<30%) for this polishing recovery step 180, the slurry is easily separated as follows:

Newly fiber polymer rich streams including: 184 and 186 are put back into the process at step 60; and Filler/adhesive rich streams: 187 and 188 are put back into the process at step 150.

The present process can further comprise another auxiliary recirculation recovery and polishing step 190, an ionization step. In step 190, free electrons are injected into the dry mixed-fiber filler/adhesive streams to reduce the electrostatic triboelectric cling forces between the mixed fibers and the latex rubber portions of the filler/adhesive contaminate. This step 190 can be practiced just upstream of either or both of screen sifting steps 40, 170, if at all, to maximize screen sifting performance and reduce the filler/adhesive contaminant in the polymer fiber.

The present process can further comprise positive polarity electrostatic polishing separation step 200. As the mixed fibers are purified through the process separation steps, resultant dry purified face fiber streams 111 and 157 are additionally refined to effectively single polymer fibers and minimal filler/adhesive residue. This special electrostatic separation step 200 can be utilized to extract even further filler/adhesive residue contaminate.

From the material handling 111 and/or 157, the singular fiber and filler/adhesive residues are agitated together, and differing polarity electrostatic charges are generated on these two components. This surface charging phenomena of insulative materials, known as triboelectrically charging, creates a "positive charge" on the nylon face fiber and a "negative" surface charge on the exposed latex rubber adhesive in the filler/adhesive matrix.

Process separation step 200 creates a positive polarity extraction point where by the negatively charged filler/adhesive composite is culled by electrostatic forces from the positively charged face fibers. Then, the effectively pure face fibers 202, 204 are utilized at maximum A value, and the extracted filler/adhesive residue 206, 208 is routed to step 150.

The present process can further comprise negative polarity electrostatic polishing separation step 210. As the mixed fibers are purified through the process separation steps resultant dry purified backing stream 134 can be additionally refined to effectively single polymer fibers and minimal filler/adhesive residue. This special electrostatic separation step 210 can be utilized to extract even further filler/adhesive residue contaminate.

From the material handling stream 134, the singular backing fiber and filler/adhesive residues are agitated together, and differing polarity electrostatic charges are generated on the two components. This surface charging phenomena of insulative materials known as triboelectrically charging, creates a "negative charge" on the polypropylene backing fiber and a "positive" surface charge on the exposed latex rubber adhesive in the filler/adhesive matrix.

Process separation step 210 creates a negative polarity extraction point whereby the positively charged filler/adhesive composite is culled by electrostatic forces from the negatively charged backing fibers. Then, the even further purified backing 212 is utilized at maximum value B, and the extracted filler/adhesive residue 214 is routed to step 150.

Returning to the entering feed stream of the entire recycling process of the present invention, in one embodiment, the process can focus on the recycling of carpet edge trim selvage. Verification centrifuge pilot trials of such selvage recovery unexpectedly showed advantages to include post-consumer whole carpet in the feed stream. It has been found that a recycling process including not only carpet selvage, but also for example, post consumer nylon carpet components, is beneficial.

Focusing on the polymers in TABLES 1 and 2, it can be seen that the whole carpet reliably contains higher levels of face fiber in ratio to the backing polymer. Inversely, the edge selvage contains greater levels of backing material than that of whole construction.

As discussed herein, edge trim generated by a modern carpet factory almost always minimizes the amount of the higher value face fiber, which is typically wasted as selvage by the manufacture. Random lab testing of postindustrial edge trim selvage and post consumer whole carpet suggests the discrepancy between face fiber polymers to backing polymers is, for all practical purposes, extreme and inversely proportionate.

Typical component results are as follows:

TABLE 5

| % Composition | Component Types |
| --- | --- |
| 35% | Nylon face fiber |
| 65% | Polypropylene backing primary and secondary |

TABLE 5 illustrates a typical example of post industrial edge selvage (polymer only).

TABLE 6

| % Composition | Component Types |
| --- | --- |
| 85% | Nylon face fiber |
| 15% | Polypropylene backing primary and secondary |

TABLE 6 illustrates a typical example of whole post consumer carpet (polymer only).

Resultant polymer products generated from trials of the present process have cross polymer contamination. This is a result of varying size pieces of face fiber stuck to varying size pieces of backing fiber polymer, that are not liberated from each other prior to the centrifuge separator step 70. If a face fiber piece has a smaller piece of backing fiber stuck to it, probably due to known adhesive component, in the centrifuge separator, it will sink out and comprise backing polymer contamination in the resultant face fiber polymer stream 92 that is >1 g/cm$^3$.

Conversely if a piece of backing polymer fiber (<1 g/cm$^3$) has a smaller piece of face fiber, the face fiber particle can end up as contaminant in the backing stream 74 that floats out of the centrifuge.

Therefore, it appears that the grind size is the primary factor that affects this cross contamination phenomenon. The finer the grind, the less cross polymer attachment there is that results in cross contamination. For all practical and mitigating factors, the minimal typical granulator grind size of 5 mm typically results in 5% cross polymer contamination in the present recovery process output. One reliable exception is the edge trim selvage backing (<1 g/cm$^3$), herein specifically polypropylene, that is due to the purposely reduced or absence of filler/adhesive treatment by weight on the backing component of the selvage structure. Therefore, cross face fiber polymer contamination in the resultant separated backing stream is less, and defined herein as typically one half (2.5%) that of the whole construction typical results of 5%. TABLE 7 is a summary of the known and expected cross polymer contamination of the individual raw materials.

TABLE 7

| | Nylon selvage | Whole (post consumer) carpet |
| --- | --- | --- |
| Nylon face fiber | 5% | 5% |
| Polypropylene backing fiber | 2.5% | 5% |

Typical results of the present process, excluding the auxiliary polishing process steps 170, 200 and 210, are displayed in TABLES 8 and 9.

TABLE 8

(Separation cross polymer contamination of carpet edge selvage)

| Start % Composition | Component | Resultant: Expected w/5% cross contamination = |
|---|---|---|
| 35% | Nylon face fiber | ~9.3% |
| 65% | Polypropylene backing primary and secondary | ~1.3% |

TABLE 8 documents the valuable resultant backing polymer stream of effectively pure polypropylene of 98.7% (1.3% nylon face cross contamination) purity due to a combination of the consistent polypropylene abundance ~65% in the selvage raw material as well as to a lesser extent, the reduced application of adhesive on the backing fiber component selvage construction it self. This resultant high purity polypropylene backing stream is of maximum value as a highly pure melt polymer.

As expected (and verified by pilot trials) the resultant face fiber separated stream exhibits very high polypropylene backing cross contamination of ~9.3%, and therefore a nylon stream of ~90.3% purity. While this stream is of more value than the almost zero value selvage, it is of middling value as a melt polymer since nylon melts at >200° C. and polypropylene at <<200° C. ≦5% cross polymer contamination is a typical and expected requirement of top tier recycled polymer valuation.

TABLE 9 indicates that the application of the present process on post-consumer whole carpet (including post-industrial whole carpet scrap) results in a conversely reduced valuation of the resultant polymers.

TABLE 9

(Separation cross polymer contamination whole post consumer carpet)

| Start % Composition | Component | Resultant: Expected w/5% cross contamination = |
|---|---|---|
| 85% | Nylon face fiber | 0.88% |
| 15% | Polypropylene backing primary and secondary | 28% |

TABLE 9 documents the valuable resultant nylon face fiber polymer stream of effectively pure nylon face fiber 99.12% (0.88% backing polypropylene cross contamination) purity due to the consistent nylon face fiber abundance ~85% in the whole carpet raw material. This resultant high purity nylon stream is of maximum value as a highly purified melt polymer.

As expected (and verified by pilot trials) the resultant backing fiber separated stream, from whole carpet raw material, exhibits very high nylon fiber cross contamination of ~28%, and therefore a polypropylene backing fiber stream of ~72% purity is achieved. Therefore, this stream is of no more value than the raw material itself, and typically would be wasted as a costly recovery process yield loss.

It is thus recognized that a method to valuate both polymer streams would be advantageous and desired for quality and economy of recovery. Hence, the discovery and disclosed process herein of mixing the two raw material streams, strategically, for input into the present process, which optimizes quality (resultant output polymer streams of required high purity <5% cross polymer contamination) and economy (high value of high purity resultant polymer and no reduced value or wasted process yield loss stream).

These desired effects can best be shown by TABLE 10.

TABLE 10

(Raw material mixture combinations, resultant polymer purity and cost summary)

| | % ET Nylon Selvage Input | % PC Nylon Carpet Input | Expected Separation Purity Output % Nylon | Expected Separation Purity Output % Polypropylene | Cost or Raw Material % of Full PC Cost |
|---|---|---|---|---|---|
| | 100% | 0% | 91% | 99% | 10% |
| | 80% | 20% | 94% | 97% | 28% |
| Target Mixture | 70% | 30% | 95% | 96% | 37% |
| Target Mixture | 65% | 35% | 95% | 96% | 42% |
| Target Mixture | 60% | 40% | 96% | 95% | 46% |
| | 55% | 45% | 96% | 94% | 51% |
| | 50% | 50% | 97% | 94% | 55% |
| | 45% | 55% | 97% | 93% | 60% |
| | 40% | 60% | 97% | 92% | 64% |
| | 30% | 70% | 98% | 89% | 73% |
| | 20% | 80% | 98% | 86% | 82% |
| | 0% | 100% | 99% | 72% | 100% |

It can thus be seen that mixtures of selvage raw material feed from 60 to 70% mixed with post consumer whole carpet (or other whole) at 30-40% will consistently result in maximum polymer value at <5% cross polymer contamination. Further, since the edge trim selvage is universally of minimum value (typically wasted to landfill), it is a strategic advantage of economy when utilized with post-consumer and the present process.

To demonstrate this point, the selvage raw material is defined as having a value of one tenth that of face fiber sorted purchased post-consumer whole carpet. As tabulated in TABLE 10, the target mixtures noted offers a 37 to 46% raw material cost savings discount compared to whole carpet recycling. Further, the present process, in whole or part, in combination with the strategic mixed raw material feed stream (selvage and whole carpet), is an essential key to economically unlock the land filled vaults of selvage raw material.

While the invention has been disclosed in its preferred forms, it will be apparent to those skilled in the art that many modifications, additions, and deletions can be made therein without departing from the spirit and scope of the invention and its equivalents as set forth in the following claims.

We claim:

1. A component recovery process comprising:
providing a material feed including fiber, filler and adhesive;
shredding the material feed to liberate filler and adhesive from the fiber;
screening the shredded material feed, yielding at least two resultant streams, wherein
a first resultant stream comprises fiber suitable for depolymerization feed stocks; and
a second resultant stream comprises filler suitable for direct reinforcement in polymer resins;
combining the first resultant stream with a liquid to form a slurry; and
centrifuging the slurry at a G-Force of 30 G or less.

2. The component recovery process according to claim 1, further comprising drying the material feed prior to shredding, drying the material feed enhancing the liberation of filler and adhesive from the fiber.

3. The component recovery process according to claim 1, further comprising the introduction of electrostatic ionization prior to screening, electrostatic ionization directionally reducing triboelectric cling forces between the adhesive and the fiber, enhancing the liberation of adhesive from the fiber.

4. The component recovery process according to claim 1, the material feed comprising a mixture of edge trim selvage and whole carpet, the mixture providing for increased purification of the resultant streams.

5. The component recovery process according to claim 1, the material feed comprising a mixture of fibers comprising nylon type 6 and type 6,6.

6. The component recovery process according to claim 1, wherein the centrifuging step is configured to separate one material from another and wherein both materials have a density greater than the liquid in the slurry.

7. The component recovery process according to claim 1, further comprising an auxiliary dryer bypass step comprising a friction style agglomeration densifier.

8. The component recovery process according to claim 1, further comprising a filler product treating step, comprising the step of sanitizing a stream of the process comprising a majority of filler.

9. The component recovery process according to claim 1, further comprising a positive polarity electrostatic polishing separation step to further separate fiber from filler/adhesive residue.

10. The component recovery process according to claim 1, further comprising a negative polarity electrostatic polishing separation step to further separate fiber from filler/adhesive residue.

11. A component recovery process comprising:
providing a material feed including fiber, filler and adhesive;
shredding the material feed to liberate filler and adhesive from the fiber;
first screening the shredded material feed, forming a first screening effluent;
milling the first screening effluent stream to further liberate filler and adhesive from the fiber; and
second screening the milled first screening effluent stream, yielding at least two resultant streams, wherein
a first resultant stream comprises fiber suitable for depolymerization feed stocks; and
a second resultant stream comprises filler suitable for direct reinforcement in polymer resins;
combining the first resultant stream with a liquid to form a slurry; and
centrifuging the slurry at a G-Force of 30 G or less.

12. The component recovery process according to claim 11, further comprising drying the material feed prior to shredding, drying the material feed enhancing the liberation of filler and adhesive from the fiber.

13. The component recovery process according to claim 11, further comprising drying the effluent from one or both of the steps of shredding and first screening.

14. The component recovery process according to claim 11, further comprising the introduction of electrostatic ionization prior to screening, electrostatic ionization directionally reducing triboelectric cling forces between the adhesive and the fiber, enhancing the liberation of adhesive from the fiber.

15. The component recovery process according to claim 11, the material feed comprising a mixture of edge trim selvage and whole carpet, the mixture providing for increased purification of the resultant streams.

16. The component recovery process according to claim 11, the material feed comprising a mixture of fibers comprising nylon type 6 and type 6,6.

17. The component recovery process according to claim 11, further comprising, in series, a single cone centrifuge utilizing a water separation solution, and a continuous horizontal scroll/screen centrifuge.

18. The component recovery process according to claim 11, further comprising an auxiliary dryer bypass step comprising a friction style agglomeration densifier.

19. The component recovery process according to claim 11, further comprising a filler product treating step, comprising the step of sanitizing a stream of the process comprising a majority of filler.

20. The component recovery process according to claim 11, further comprising a positive polarity electrostatic polishing separation step to further separate fiber from filler/adhesive residue.

21. The component recovery process according to claim 11, further comprising a negative polarity electrostatic polishing separation step to further separate fiber from filler/adhesive residue.

22. A component recovery process comprising:
providing a material feed including fiber, filler and adhesive;
shredding the material feed to liberate filler and adhesive from the fiber;
first screening the shredded material feed, forming a first screening effluent;
milling the first screening effluent stream to further liberate filler and adhesive from the fiber;
second screening the milled first screening effluent stream, forming a second screening effluent;
granulating the second screening effluent stream;
slurrying the effluent of the granulating step to form a slurry; and
centrifuging at a G-Force of 30 G or less the slurry, yielding at least two resultant streams; wherein
a first resultant stream comprises a single polymer face fiber; and
a second resultant stream comprises filler and adhesive.

23. The component recovery process according to claim 22, further comprising drying the material feed prior to shredding, drying the material feed enhancing the liberation of filler and adhesive from the fiber.

24. The component recovery process according to claim 22, further comprising drying the effluent from one or both of the steps of shredding and first screening.

25. The component recovery process according to claim 22, further comprising the introduction of electrostatic ionization prior to screening, electrostatic ionization directionally reducing triboelectric cling forces between the adhesive and the fiber, enhancing the liberation of adhesive from the fiber.

26. The component recovery process according to claim 22, the material feed comprising a mixture of edge trim selvage and whole carpet, the mixture providing for increased purification of the resultant streams.

27. The component recovery process according to claim 22, the material feed comprising a mixture of fibers comprising nylon type 6 and type 6,6.

28. The component recovery process according to claim 22, further comprising an auxiliary dryer bypass step comprising a friction style agglomeration densifier.

29. The component recovery process according to claim 22, further comprising a filler product treating step, comprising the step of sanitizing a stream of the process comprising a majority of filler.

30. The component recovery process according to claim 22, further comprising a positive polarity electrostatic polishing separation step to further separate fiber from filler/adhesive residue.

31. The component recovery process according to claim 22, further comprising a negative polarity electrostatic polishing separation step to further separate fiber from filler/adhesive residue.

32. A component recovery process comprising:
providing a material feed including fiber, filler and adhesive;
shredding the material feed to liberate filler and adhesive from the fiber;
first screening the shredded material feed, forming a first screening effluent;
milling the first screening effluent stream to further liberate filler and adhesive from the fiber;
second screening the milled first screening effluent stream, forming a second screening effluent;
granulating the second screening effluent stream;
slurrying the effluent of the granulating step to form a slurry; and
centrifuging at a high G-Force the slurry, forming a centrifuged effluent stream; and
centrifuging at a low G-Force the centrifuged effluent stream at <30 G.

33. The component recovery process according to claim 32, further comprising drying the material feed prior to shredding, drying the material feed enhancing the liberation of filler and adhesive from the fiber.

34. The component recovery process according to claim 32, further comprising drying the effluent from one or both of the steps of shredding and first screening.

35. The component recovery process according to claim 32, further comprising the introduction of electrostatic ionization prior to screening, electrostatic ionization directionally reducing triboelectric cling forces between the adhesive and the fiber, enhancing the liberation of adhesive from the fiber.

36. The component recovery process according to claim 32, the material feed comprising a mixture of edge trim selvage and whole carpet, the mixture providing for increased purification of the resultant streams.

37. The component recovery process according to claim 32, the material feed comprising a mixture of fibers comprising nylon type 6 and type 6,6.

* * * * *